United States Patent

[11] 3,624,496

[72] Inventors Lester Feinstein
Palo Alto;
Ronald J. Hruby, Campbell, both of Calif.
[21] Appl. No. 889,583
[22] Filed Dec. 31, 1969
[45] Patented Nov. 30, 1971
[73] Assignee The United States of America as represented by the Administrator of the National Aeronautics and Space Administration

[54] METHOD AND APPARATUS FOR SWEPT-FREQUENCY IMPEDANCE MEASUREMENTS OF WELDS
10 Claims, 10 Drawing Figs.

[52] U.S. Cl. .................................................. 324/71 R,
324/57 R, 324/64
[51] Int. Cl. ..................................................... G01n 27/00
[50] Field of Search ........................................ 324/40, 57, 64, 71

[56] References Cited
UNITED STATES PATENTS

| | | | |
|---|---|---|---|
| 2,857,757 | 10/1958 | Kendig et al. .................. | 324/57 X |
| 2,896,159 | 7/1959 | Webster ........................ | 324/64 |
| 3,287,637 | 11/1966 | Keller ........................... | 324/64 X |

Primary Examiner—Edward E. Kubasiewicz
Attorneys—Darrell G. Brekke and G. T. McCoy

ABSTRACT: A method and apparatus for testing integrated circuit microtab welds which includes preparing a set of reference signatures for a set of welds of known characteristics and then comparing a signature obtained from a tested weld to these reference signatures to evaluate the integrity of the tested weld. The reference and test signatures are obtained by passing high-frequency electric signals through the various welded structures and sweeping the frequency thereof through the resonance frequencies of the welds. In-phase variations and quadrature variations produced in the electric signals passed through the welds are measured and compared against the reference signatures in order to qualitatively evaluate the integrity of the tested weld.

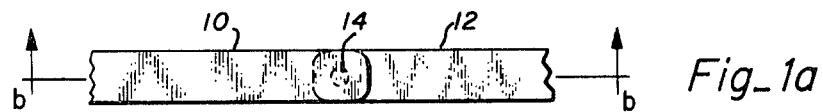
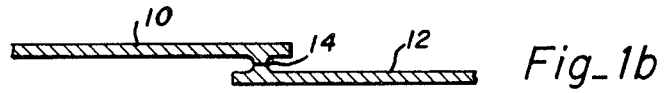
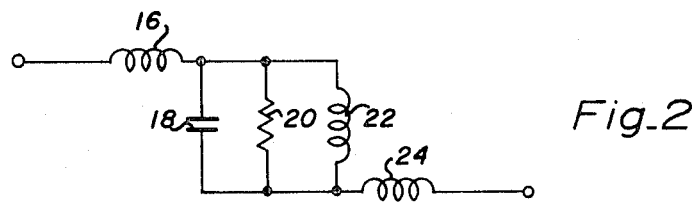
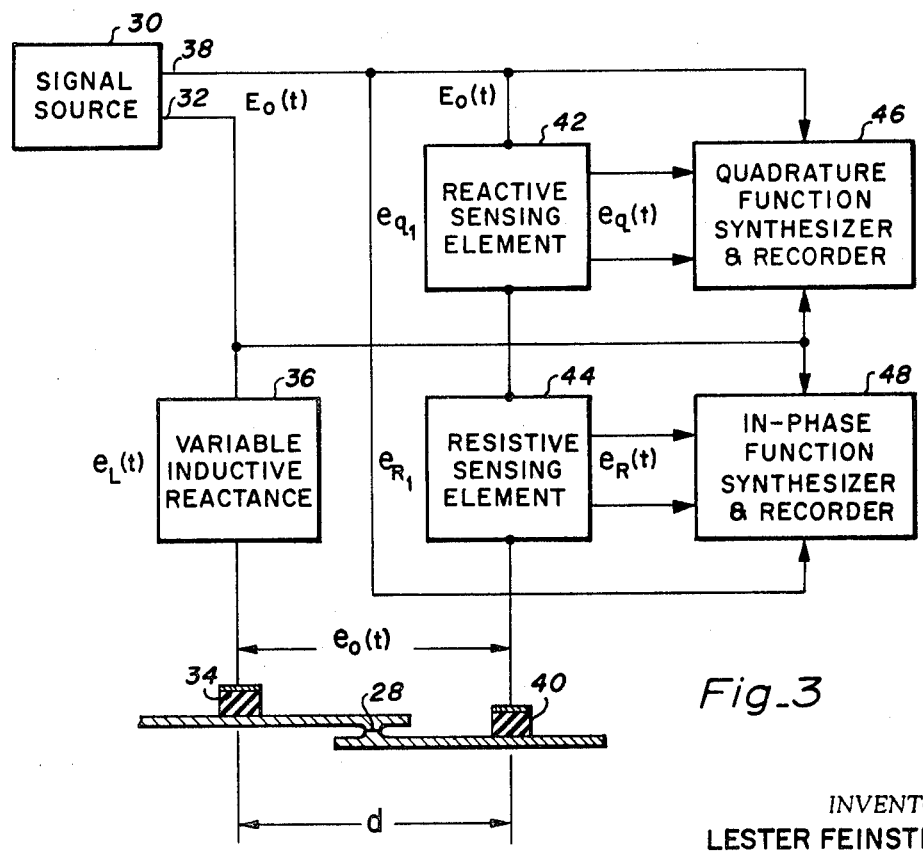

PATENTED NOV 30 1971  3,624,496
SHEET 2 OF 2
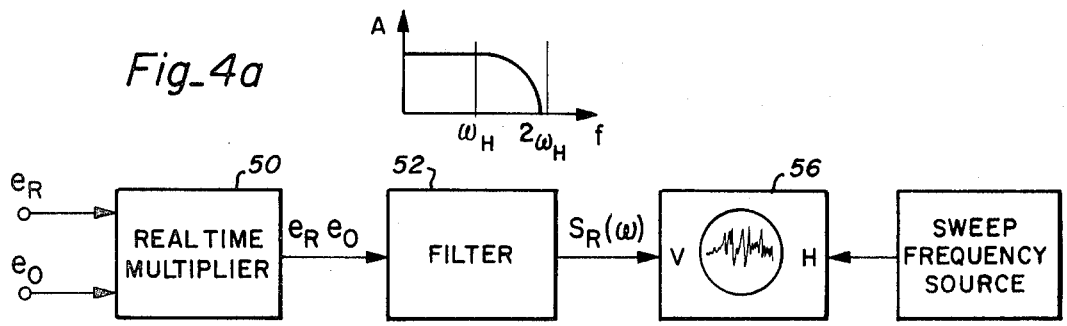
Fig_4a
Fig_4b
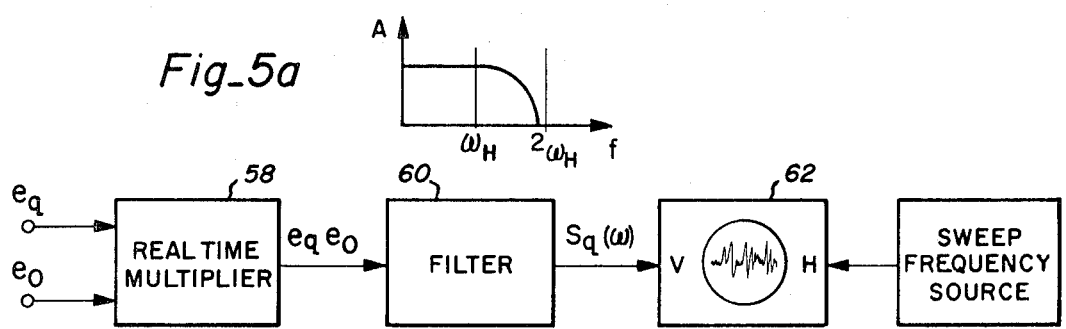
Fig_5a
Fig_5b
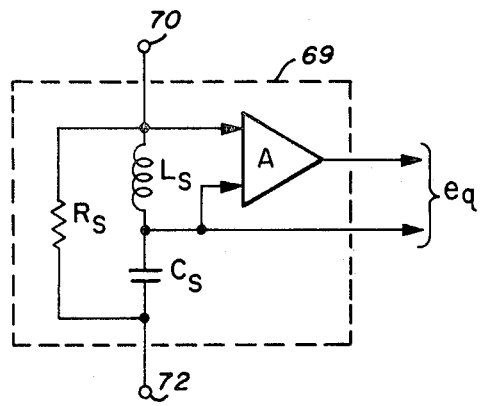
Fig_6
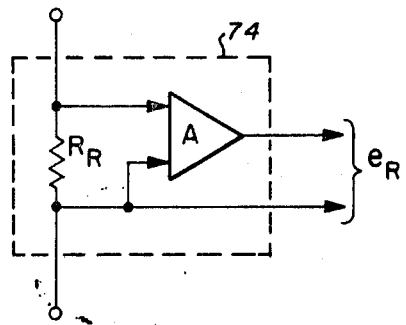
Fig_7
INVENTORS
LESTER FEINSTEIN
RONALD J. HRUBY
BY
ATTORNEYS

METHOD AND APPARATUS FOR SWEPT-FREQUENCY IMPEDANCE MEASUREMENTS OF WELDS

The invention described herein was made by employees of the United States Government and may be manufactured and used by or for the Government for governmental purposes without the payment of any royalties thereon or therefor.

BACKGROUND OF THE INVENTION

The present invention relates generally to the nondestructive testing of welds and, more particularly, to a novel nondestructive test and inspection method and apparatus wherein welded interconnects between integrated circuit microtabs can be qualitatively evaluated by obtaining impedance signatures of the welded junctions.

Integrated circuits are typically mounted in some kind of sealed header which provides for connections to the other circuits in an electronic package. The interconnects between headers are spot welded when reliability and size are paramount. However, there is at present no method available for determining nondestructively whether these interconnect spot welds are indeed sound and reliable.

Present methods of insuring spot weld reliability are based on destructive testing of a series of sample welds which represent the interconnect tabs that are to be joined in the actual circuits. These sample welds are made so that the influence of three important parameters, i.e., pressure, current and time in forming the weld, are taken into account.

In any electronic circuit assembly, each welded tab or interconnect geometry is sufficiently different from another that heretofore the only reliable way to determine the nominal value of these parameters was to construct a weld schedule. Such a weld schedule was constructed by using actual tabs or leads to make a series of welds in which the weld pressure and welding current pulse (i.e., amperes $x$ time) were varied in such a way that the desired weld strength was reached. The strength of the weld was determined by noting the force necessary to pull the weld apart. For each combination of pressure and current pulse, the strength of the weld was recorded and the complete record of these tests formed the weld schedule.

A schedule of this type shows that the variations of weld strength as a function of the parameter variations tends to follow a normal distribution curve. It indicates allowable variations in parameters that will still provide a reliable weld. Variations in pressure and current pulse duration during production of actual circuits also follow a normal distribution. Acceptable or allowed limits are determined from the characteristics of the production equipment. The actual pressure and current pulse used in production can be directly correlated with the expected failure rate through use of the weld schedule.

Although this weld schedule method does indicate the best probable combinations of welding parameters, there is unfortunately, no way in which to actually measure the strength of production welds without the possibility of damaging them. At this time, the typical production inspection procedure consists of gently prying the weld with a wooden tool and hoping for the best. Whereas the weld schedule procedure can produce reliable welds with a random failure rate of about 1 per thousand, the complexity of integrated circuit modules requires that this failure rate be reduced by several orders of magnitude and this cannot be done without a means of nondestructive testing of 100 percent of the production welds.

An obvious approach to nondestructive testing of the spot weld is to measure its DC resistance. Unfortunately, the resistance is a very poor indicator of the weld since part of the DC resistance is due to ohmic contacts not contained in the welded section. Also the actual value of the weld resistance is quite small (on the order of millohms) which makes the uncertainty of the ohmic contact between the weld material and the test probes a significant random error. The properties of the weld that are related to the strength and reliability are only indirectly related to the minimum value of the resistance since the nonwelded ohmic contact resistance varies with scheduled weld pressure causing a change in the weld resistance without a corresponding change in strength and reliability, i.e., the weld retains the original surface contact pressure without relating to its strength.

More specifically, conductivity of a metal is a function of the number of carriers available (electrons), their mass, and their relaxation time which may be interpreted as an indication of the time available for motion. The latter term is influenced by defects and impurities and there are many ways to described how these influences are evidenced. In general, one could consider that conductivity could be described by the relation $$\sigma_0 = ne^2\tau/m$$

Wherein:
$\sigma_0$ = conductivity;
$e$ = electron charge;
$m$ = electron mass;
and
$\tau$ = electron relaxation time or means free time.

It can be seen that electrical conductivity is linear in the number of free carriers and the relaxation time and in the reciprocal of the electron mass. Therefore, a small change in either of these factors is reflected in a similarly small change in the metal's conductivity. In a metal which is being stressed or in a joint, such as a spot weld that has some degree of disorder and imperfections, the mean free time or scattering of the carriers will be different from that of a uniform or continuous piece of metal. However, in the DC conductivity case, a change of one part in $10^6$ in lattice properties will reflect only a change of conductivity of the same order of magnitude. The effective mass of the carrier could possible change but because of the irregularity or loss of translational symmetry of the lattice at the spot weld, anisotropy is lost and the mass of the electron remains effectively the same.

When a frequency-dependent electrical field is placed across a metal, its conductivity is influenced by the frequency of the field and this can be represented approximately by $$\sigma(\omega) = \sigma_0 / 1 + \omega^2\tau^2$$

The term in the denominator of the expression for the AC conductivity of a metal can be modified so that it can be written as $$\sigma(\omega) = \frac{ne^2}{m} \frac{\lambda(\omega, T)}{\omega^2 + \lambda^2(\omega, T)}$$

where the relaxation time $\tau$ has been replaced by a term $\lambda$ (which is a function of both $\omega$ and T, temperature) the frequency-dependent decrement.

For frequencies of the applied signal where $\omega\tau << 1$ and $\tau$ is in the order of $10^{-13}$ sec., $\lambda$ has a fifth power dependence in the ratio of $\omega$ to the Debye temperature of the metal, i.e., in terms of equivalent energy. In addition, there are localized oscillations excited in the region of the imperfections when an AC signal is imposed across the region. These localized oscillations will further affect the phonon-electron interaction which is reflected in the admittance of the region under examination. These two factors are the important reasons why an AC signal can be used to probe the lattice of a metal in terms of its impedance or admittance.

As experimental confirmation of this, we have the work reported in "The Physics of Metals and Metallography" 21, No. 5, 1966, p. 165 and in "British Journal of Applied PHysics" 18,p. 1251, 1967. In each case strains in the elastic region were applied to specimens and changes in DC resistivity were difficult, if not impossible to detect. However, with AC signal the effective impedance of the specimens was detectably changed under the same conditions.

When resonance is discussed in this application, it is considered in the sense of the change in impedance or acceptance due to the changed AC conductivity of the weld because of the disorder induced effects. For an alternating current field, the bulk conductivity may be replaced by a surface admittance which may be expressed as Y $$Y = c^2 \frac{2\pi\omega\sigma(\omega)(1+i)}{4\pi\omega c}$$

wherein:
$c$ = velocity of light;
$\omega$ = frequency of the applied field;
$\sigma(\omega)$ = bulk conductivity at frequency $\omega$; and
$= -1$.

The term $c/2\pi\omega\sigma(\omega)$ represents the normal skin depth under AC conditions; and in addition one could define a dielectric permeability as $$\epsilon(\omega) = \frac{4\pi i}{\omega}\sigma(\omega)$$

The primary factor in determining the conductivity and dielectric permeability of a metal is its relaxation time, or electron means free path, which is related to the interaction of an electron with the metal atoms in the form of phonon-electron interaction and the electron-electron interaction.

In the direct current case the change of resistance or conductance of a metal is almost linear with lattice changes and consequently it is extremely difficult if not impossible to detect changes in electrical properties due to small changes in the lattice, i.e., strain or induced disorder. And consequently, it would be difficult to interpret the soundness of a welded joint on the basis of its DC conductivity.

However, when an AC signal is impressed across a metal specimen, there are significant and measurable changes in the specimen's impedance as a function of the strain or disorder of the member and the present invention is directed toward a method and apparatus for nondestructively testing a metal specimen using AC signals.

OBJECTS OF THE PRESENT INVENTION

It is therefore a primary object of the present invention to provide a novel method and apparatus for quickly, accurately and nondestructively evaluating the quality of a weld.

Another object of the present invention is to provide a novel method and apparatus for nondestructively testing welds so that malformations in the physical and/or electrical properties of the weld can be detected.

Still another object of the present invention is to provide a novel method and apparatus for conducting direct measurements of weld quality following environmental and destructive testing of electronic systems.

Still another object of the present invention is to provide a novel method and apparatus for electrically inspecting microcircuit tab welds using an inspection signal frequency in the radio frequency to microwave-frequency range.

SUMMARY OF THE PRESENT INVENTION

In accordance with the present invention, a set of reference signatures is obtained from a set of welds having known characteristics varying in degree from unsatisfactory to more than acceptable quality, such welds being formed by using different combinations of welding parameters. The signatures are obtained by passing a sinusoidal signal of variable frequency through each weld and sweeping the signal frequency through the resonant frequencies thereof. These frequency-dependent admittance characteristics or signatures are recorded for each weld so as to provide a set of particular signatures which directly correspond to the respective welds formed by the various weld parameter combinations.

The frequency-dependent signatures, each of which consists of an in-phase frequency function and a quadrature (±90° phase shift) frequency function, are constructed by adjusting the swept-frequency range so that each point in the weld schedule has a unique signature. This may require excluding part of the total frequency response to increase the resolution of fine structure in a small range not necessarily around resonance.

The sensitivity of this nondestructive inspection procedure depends upon the discernible changes from point to point on the weld schedule. During production inspection, the specific signatures for each weld test are recorded and compared against the reference signatures and if the signature falls within a predetermined acceptable range, the weld is approved, otherwise it is considered unsatisfactory and is rejected.

IN THE DRAWINGS

FIG. 1(a) and (b) illustrate in plan and cross section respectively, a microcircuit spot weld of a type which may be tested in accordance with the present invention.

FIG. 2 is an electrical equivalent of the weld illustrated in FIG. 1.

FIG. 3 is a block diagram of a test system in accordance with the present invention.

FIGS. 4(b) and 5(b) are block diagrams of function synthesizer and recorder circuits used in accordance with the present invention.

FIGS. 4(a) and 5(a) depict frequency response graphs of the filters employed in the circuits of FIGS. 4(b) and 5(b).

FIG. 6 is a simplified reactive sensing element in accordance with the present invention.

FIG. 7 is a simplified resistive sensing element in accordance with the present invention.

DETAILED DESCRIPTION OF THE PRESENT INVENTION

Turning now to FIG. 1 of the drawings, two tabs 10 and 12 are shown (in both plan and cross section) welded together at 14 to illustrate one form of weld which may be nondestructively inspected using the present invention. The electrical equivalent of a weld of this type is illustrated in FIG. 2 and includes a series parallel resonant circuit comprised of a linear inductance 16, an overlap capacitance 18, a weld resistance 20, a weld inductance 22 and a second linear inductance 24. Although the precise relationship between the equivalent circuit elements is complex, the idealized model shown in FIG. 2 is a reasonably accurate electrical representation of the weld characteristics between the radiofrequency range and the ultrahigh frequency range. However, as the frequency is lowered, the inductive elements disappear and the value of the equivalent weld resistance reduces to its DC value which is quite different from its high frequency value.

The method of the present invention includes welding together a plurality of tabs 10 and 12 varying in each case the weld parameters and then introducing a sinusoidal signal of variable frequency across each of the welded tabs 10 and 12 and sweeping the signal frequency through the resonant frequencies thereof recording the response characteristics of each weld. This may be considered analogous to the construction of a weld schedule and will be hereinafter referred to as a weld schedule. The frequency-dependent admittance characteristics, which may be considered the signatures of the welds, are noted for each weld (each point in the weld schedule) to provide a correspondence between signature and weld parameter combinations. Each signature consists of an in-phase frequency function and a quadrature frequency function which uniquely identify the characteristics of a given weld.

For each weld specimen or type, the unique property of the in-phase or quadrature signature is located in the proper range of signal frequency so that once the center frequency has been located, the frequency sweep range can be determined so that the individual signatures will be resoluable from each other. The frequency-dependent signatures are then constructed by adjusting the sweep frequency range so that each point in the weld schedule has a unique signature. This may require excluding part of the total frequency response to increase the resolution of fine structure in a small range not necessarily around resonance. There will be a gradual change in the characteristics of the signature as a function of weld pressure and current pulse duration. The sensitivity of this nondestructive inspection procedure depends upon the discernible changes from point to point of the weld schedule.

During production inspection the measured signatures for each weld are recorded and compared against the reference signatures recorded in the weld schedule. If the measured signature is characteristic of reference signatures falling within an accepted range, the weld will be approved. Otherwise, it will be considered unsatisfactory and will be rejected. It should be noted that as experience with this technique of weld inspection increases, it may be possible to eliminate the need for correlating admittance with weld schedules for each job. There should be a range of admittance which is characteristic of a good weld for each tab geometry in some frequency range. The type of actual test circuitry used to establish these weld signatures will be dependent upon the center signal frequency.

Since the weld is a two-terminal device, there is a theoretical maximum of two different signatures. This unique set of signatures corresponds to the current components in phase and in quadrature with respect to the source voltage. The signatures can be used to derive an equivalent LCR linear network by an appropriate synthesis procedure. These networks are unique hence no more than two signatures can be realized without redundancy. The simplest linear network is shown in FIG. 2 of the drawings. The current signatures corresponding to the sum of the in-phase component and quadrature component which occur in the external test circuit and can be separated by suitable reactive of resistive elements in the inspection instrument.

THe inspection system schematic is shown in FIG. 3 and includes a sweep frequency signal source 30, the output terminal 32 of which is connected to a first capacitive electrode 34 through a variable inductive reactance 36. The other output terminal 38 of the signal source is connected to a second capacitive electrode 40 through a reactive sensing element 42 and a resistive sensing element 44. Responsive to the reactive sensing element 42 is a quadrature function synthesizer and recorder 46. Responsive to the resistive sensing element 44 is an in-phase function synthesizer and recorder 48. The actual circuits used in this schematic system will depend upon the interrogation frequency range, but the equivalent system circuit is the same.

The operation of the test circuit illustrated in FIG. 3 of the drawings depends upon a negligible voltage drop across the contact capacitances 34 and 40 at microwave frequencies and a predictable reactance at radiofrequencies. The capacitive contact is more stable and repeatable than an ohmic contact since the capacitance is due to an integrable average over its surface. For greater precision in narrow-band applications, the variable inductive reactance 36 can be used to neutralize the contact capacitance. This reactance, however, need not be used in obtaining broad band signatures. The inspection system physical geometry must be recorded as part of the signature analysis since it will vary from case to case. An important factor in the physical geometry of the inspection system is the separation distance "d" between the contacts 34 and 40 as shown in FIG. 3.

A very important error in DC measurements is the ohmic contact resistance between the probe leads and the welded tabs. In the system illustrated in FIG. 3 of the drawings, this problem is resolved by using the capacitance coupling means 34 and 40. This technique is uniquely adaptable to the problem of microcircuit tab welds where the inspection signal frequency is in the radiofrequency to microwave-frequency range and the inspection test circuitry is formed of ultraminiature lumped elements. The restriction on signal center frequency and probe diameter is that the reactance of the probe tip capacitors is small compared to the significant reactive or resistive elements in the weld or can be neutralized or calibrated. This approach eliminates the random error associated with metal-to-metal contacts since the surface potential barrier does not form and irregularities in the metallic surfaces are averaged over the normal surface of the probe.

The dimensions of the weld, probe separation, and tab width and depths must be small compared to a signal freespace wavelength. This is important because it is desired to operate with lumped elements in order to minimize skin depth problems associated with travelling waves. There must be signal current through the circumference of the weld. Skin depth effects will limit the penetration into the weld if the weld is good, but will have a greater penetration if the weld is poor. Moreover, this will have a corresponding effect on the sweep frequency signatures.

Since the current $i_o(t)$ flows from the signal source 38 through the reactive sensing elements 42, the resistive sensing element 44, the capacitive contacts 34 and 40, as well as the weld 28, and the variable inductive reactance 36, it will have a relative phase angle $\Phi(\omega)$ with respect to the applied voltage $e_o(t, \omega)$ This phase angle will vary with the frequency of the signal source 30. The in-phase signature is developed by taking the product of $e_o(t, \omega)$ and $e_R(t, \omega)$ and passing the resultant signal through a low-pass filter whose cutoff frequency is greater than $\omega_H$ but less than $2\omega_H$. This development may be shown according to the relationship (1) $e_o(t, \omega) = E_o \sin \omega t \pm j e_{q_1}(t,\omega) - j[e_{c_1}(t,\omega) + e_{c_2}(t, \omega) - e_L(t, \omega)]$ from which the approximation (2) $e_o(t,\omega) \cong E_o \sin \omega t$ can be derived. Similarly $e_R(t, \omega)$, which is the voltage in phase with the current $i_o$, can be shown as (3) $e_R(t, \omega) = E_R(\omega) \sin (\omega t + \Phi(\omega))$.

Therefore, the in-phase component $S_R(\omega)$ can be expressed as (4) $S_R(\omega) = E_o(t, \omega) e_R(t, \omega)$ which when filtered is (5) $$S_R(\omega) = \frac{E_o E_R(\omega)}{2} \cos [\phi(\omega)]$$

Similarly, the voltage $E_q(t,\omega)$, which is the voltage in quadrature with the current $i$ can be expressed as (6) $e_q(t,\omega) = E_R(\omega \cos \omega t + \Phi(\omega)$ which, when combined with the approximation of equation (2), can be used to obtain the quadrature component $S_q(\omega)$ which may be expressed as (7) $S_q(\omega) = E_o(t,\omega) e_q(t,\omega)$ or after filtering as (8) $$S_q(\omega) = \frac{E_o E_R(\omega)}{2} \sin [\phi(\omega)]$$

The in-phase component $S_R(\omega)$ is the envelope of the projection of $i_o$ and $e_o$, and the quadrature component $S_q(\omega)$ is the envelope of the projection of $i_o$ on a vector at quadrature with respect to $e_o$. These signatures are different because the phase angle $\Phi(\omega)$ and the magnitude $E_R(t,\omega)$ are both functions of frequency and, hence, time. If $E_o(t,\omega)$ and $e_R(t,\omega)$ are combined as a sum or a difference, then the cos $[\Phi(f)]$ envelope will be modulated at $2\omega$, which might be an advantage if the center frequency is low enough for digital processing.

In FIG. 4(b) of the drawings, a block diagram of an in-phase function synthesizer and recorder is illustrated which can be used to obtain the in-phase component $S_R(\omega)$. The apparatus includes a real time multiplier 50, into which the in-phase voltage $e_R$ and the voltage $e_o$ are fed, a filter 52 and a suitable recorder means 56. THe multiplied output $e_R e_o$ is fed through the filter 52 which has low-pass characteristics as indicated in FIG. 4(a), and the resultant in-phase component $S_R(\omega)$ is obtained which can be fed into a scope or other recording device 56 to provide a visual or recorded indication of the signature.

Similarly, the quadrature signature $S_0(\omega)$ can be obtained by a quadrature function synthesizer and recorder including a real time multiplier 58, filter 60 and recorder 62 as indicated in FIG. 5(b) of the drawings. FIG. 5(a) depicts the frequency response graph of the low-pass filter 60.

A simplified reactive sensing element is illustrated at 69 in FIG. 6 of the drawings and includes a sensing inductor $L_s$ and a sensing capacitor $C_s$ in series between the terminals 70 and 72 with a Q adjuster $R_s$ shunted thereacross. The sensing inductor reactance and sensing capacitor reactance cancel each other at some point in the frequency range. This reduces the voltage drop across the sensing element and makes the interaction between the reactive sensor and the welded tab a minimum. $R_s$ adjusts the Q of the series resonant circuit such that the change in $e_{q_1}$, due to frequency change only, is kept to a minimum during the frequency sweep. However, $e_q$ will vary linearly with frequency to the first order.

The ideal sensing element circuit is one which has zero voltage drop $e_{q_1}$ and maximum output voltage $e_q$. The circuit 69, illustrated in FIG. 6, is the simplest approximation to this ideal for a narrow-band system. For wide-band applications, either $L_s$ or $C_s$ would be jumpered and $R_s$ would be removed. The output $e_q$ is taken across inductor $L_s$ and is amplified by an amplifier A.

A simplified resistive sensing element for both broadband and narrow-band applications is illustrated at 74 in FIG. 7 and includes a resistance sensing element $R_R$ and a signal amplifier A coupled thereacross. From this circuit the in-phase voltage $e_R$ can be obtained. The minimum practical value of $R_R$ should be used in such a circuit in order to minimize the effects upon the voltage across the welded tabs.

It should be noted that the representations of FIGS. 6 and 7 are equivalent circuits and that the actual devices could be quite different and will vary radically with center frequency and frequency sweep range.

Although the above description has been drawn to a single preferred embodiment of the present invention, many alterations and modificatons of the invention will undoubtedly become apparent to those skilled in the art. It is therefore to be understood that this embodiment is shown and described for purposes of illustration only and is not intended to be limiting in any way. Accordingly, it is intended that the appended claims be interpreted as covering all modifications which fall within the true spirit and scope of the invention.

What is claimed is:

1. Nondestructive test apparatus for inspecting and evaluating the integrity of a weld joining first and second metallic pieces comprising:
   signal source means for generating across first and second terminals an alternating signal the frequency of which is swept over a predetermined range of frequencies;
   a first probe coupled to said first metallic piece on one side of said weld;
   means for connecting said first probe to said first terminal;
   a second probe coupled to said second metallic piece on the opposite side of said weld;
   a reactive waveform sensing element;
   a resistive waveform sensing element;
   said reactive and resistive elements being connected in series between said second terminal and said second probe; and
   function synthesizing means connected to said reactive and resistive elements for providing graphic signatures of the weld characteristics.

2. Nondestructive test apparatus as recited in claim 1 wherein said first and second probes each comprise a capacitive probe so as to eliminate the introduction of any ohmic contact resistance between said probes and said metallic pieces.

3. Nondestructive test apparatus as recited in claim 1 wherein said first and second probes each comprise an electrode and a dielectric, and each of said dielectrics is sandwiched between one of said metallic pieces and one of said electrodes.

4. Nondestructive test apparatus as recited in claim 1 wherein said first and second probes each comprise a capacitive probe having a reactance which is small compared to the impedance of said weld.

5. Nondestructive test apparatus as recited in claim 2 wherein said function synthesizing means includes a quadrature function synthesizer responsive to said reactive sensing element and an in-phase function synthesizer responsive to said resistive sensing element.

6. Nondestructive test apparatus as claimed in claim 5 wherein said quadrature synthesizer and said in-phase synthesizer each comprise a multiplier, a filter and means for displaying a waveform.

7. A nondestructive test apparatus as claimed in claim 6 wherein said signal from said signal source is fed to each of said multipliers, and each filter is coupled between its respective multiplier and displaying means.

8. A nondestructive test apparatus as claimed in claim 7 wherein said filters are of the low-pass variety having a cutoff frequency between the highest frequency swept by the signal source and twice that frequency.

9. A nondestructive test method for evaluating the integrity of a weld comprising the steps of:
   passing a time-varying electric signal through said weld;
   sweeping the frequency of said signal over a predetermined range of frequencies;
   sensing the in-phase variations produced in said time-varying signal by said weld;
   sensing the quadrature variations produced in said time-varying signal by said weld;
   providing a graphical representation of each of said variations, said graphical representations being indicative of the integrity of said weld.

10. A nondestructive testing method as recited in claim 9 and further including the step of comparing said graphical representations with a set of reference representations to qualitatively evaluate the weld being tested.

* * * * *